UNITED STATES PATENT OFFICE 2,523,793

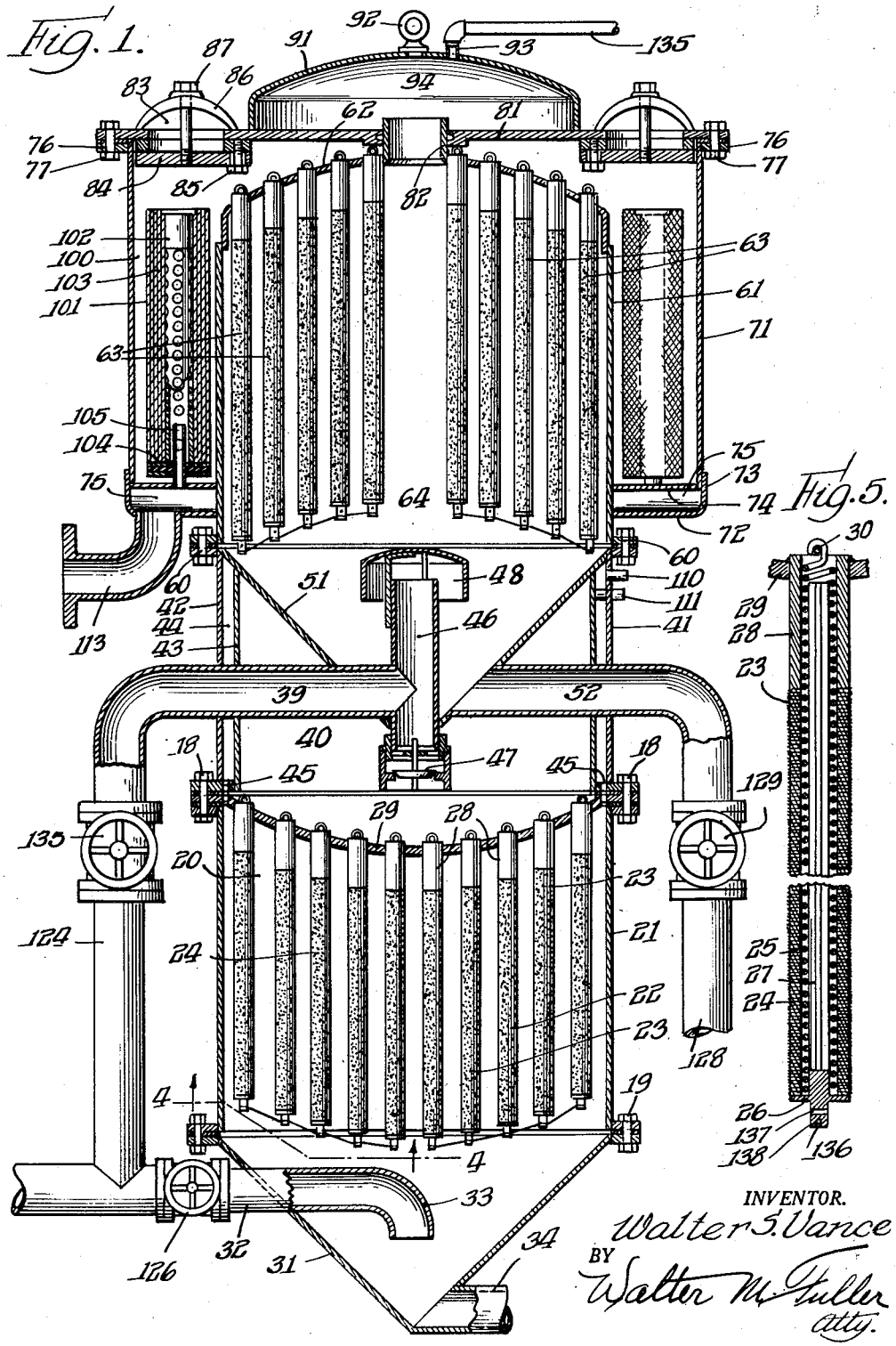

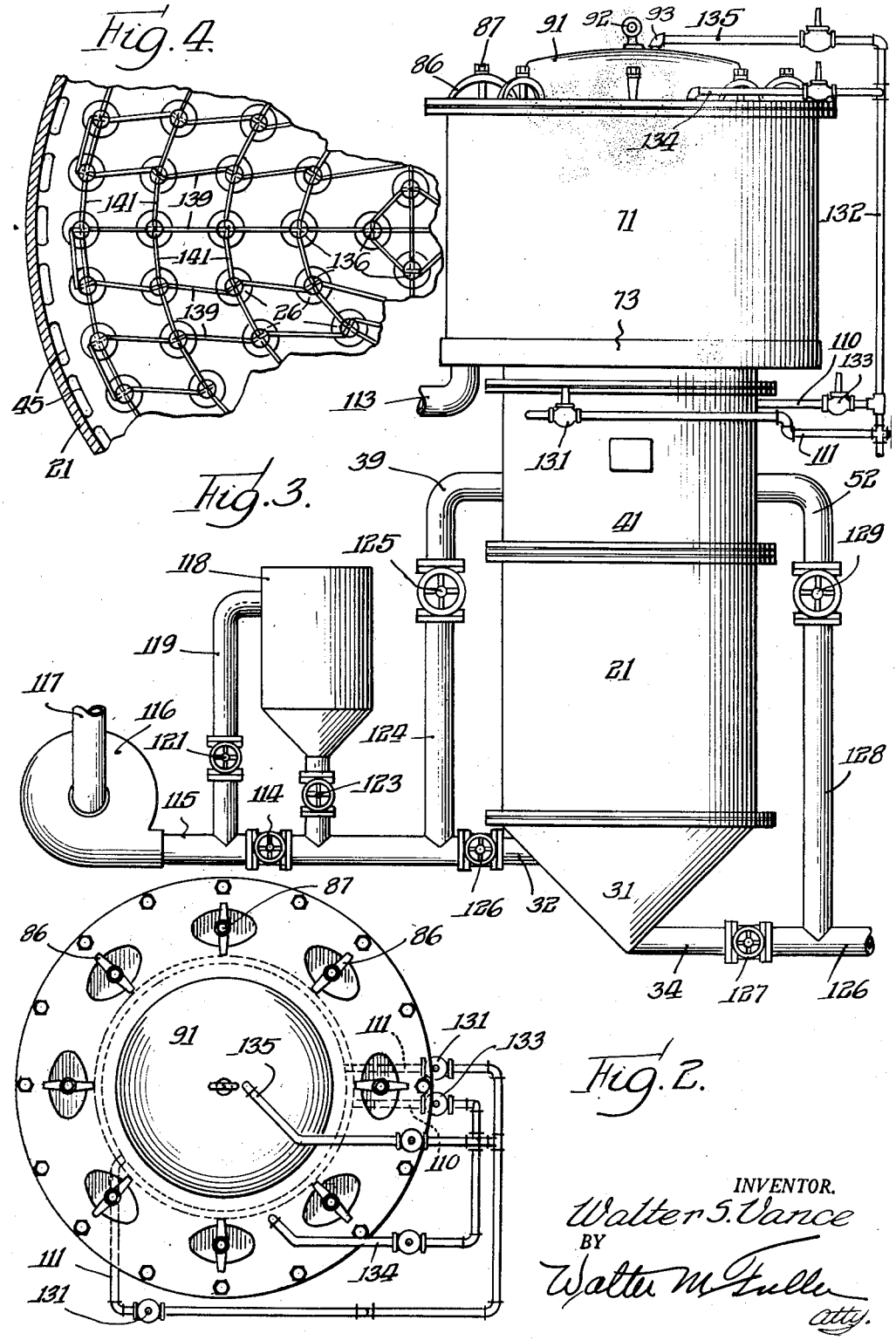

COMPOUND FILTER

Walter S. Vance, Detroit, Mich., assignor, by mesne assignments, to Bendix Aviation Corporation (Delaware), Detroit, Mich., a corporation of Delaware Application October 6, 1943, Serial No. 505,094

7 Claims. (Cl. 210—184)

The condensate or water resulting from the condensed discharged steam from steam-engines or steam-turbines of sea-going and possibly other vessels, or from other sources, is ordinarily sufficiently contaminated with the lubricant used in the power-appliances employing the steam under pressure to require its elimination before the water can be properly converted into steam for reuse, since the polluting lubricant would detrimentally coat the tubes of the boiler resulting in inefficient operation of the boiler or destruction of the tubes and would create an uneven or non-uniform development of steam with consequent objectionable vibration, bumping, foaming or splashing.

The main object of this invention is, therefore, to provide an effective procedure for eliminating the oil or lubricant from the water and at relatively small cost with employment of means requiring a minimum of attention to continue in efficient operation.

Such liquid of steam-condensation is in the form of an emulsion and, in order to separate the contained constituents therefrom, it is necessary to first destroy or break up such emulsion condition, that is to say, to de-emulsify the liquid, and this is accomplished by causing the minute oil-globules, which are too small to rise and separate out of the emulsion by themselves, to coalesce or unite in sufficiently large globules capable of ascending and rising to the top of the liquid from which they can be removed.

Whether this change is accomplished mechanically or electrically may be an open question, but I have discovered that it can best be accomplished by one or more edge-filtration filters covered with an appropriate precoat or filter-aid.

This result is obtained in the first of a plurality of filters connected together in series relation and consequently operative consecutively.

Such primary edge-filtration filter desirably consists of a plurality of hollow, cylindrical filter-elements arranged in parallel operative relation so that they are all working practically equally at the same time, each such filter-element consisting of a stack or pack of crepe-paper layers in face-to-face contact with one another and in register with one another, providing a central aperture through the group or series, one end only of such passage being closed.

In the present preferred form of the invention, such paper is charged or impregnated with a water-soluble phenolic-resin which by heat-treatment has been polymerized rendering it non-water-soluble, and the paper loaded therewith stable against detrimental effect thereon by the water or by the oil.

These impregnated layers are held pressed together either by a spring, or its equivalent, or by adhering the layers together by the resin itself.

Thus the spaces between the layers through which the filtrate must pass, not through the layers themselves, are extremely thin or shallow resulting in a fine degree of filtration and a strong and sturdy filter-element itself.

The outer surfaces of such filter-elements are coated with a relatively-thin layer, in some cases $\frac{1}{16}$ inch thick, of a precoat or filter-aid, of fuller's-earth, diatomaceous-earth, clay, magnesium-silicate, sand or comparable granular material.

When such agent is employed as a precoat, it is mixed with a relatively-small amount of clean liquid and then the latter is pumped through the filter-elements from the outside inwardly into their passages and from the latter, and, in so doing, the precoat material is deposited on all of the outer surfaces of the filter-elements being unable to pass through the shallow spaces of the latter, the thickness of which gaps is determined by the degree of roughness of the crepe-paper.

If the material is to be used as a filter-aid, the material is mixed with the oil-polluted water and passed through the filter where it is deposited on the specified surfaces.

Assuming that such coating has been deposited in the filter-elements to the proper thickness, when the oil-contaminated water is first forced through such coating and its supporting filter, the reaction for a certain period is similar to that of any other filter in that the coating absorbs the major portion of the oil in the condensate, but ordinarily within an hour to about an hour and one-half of operation, depending upon the amount of oil in the condensate, the coating will have absorbed all of the oil it is capable of absorbing and thereafter the coated filter-elements function to de-emulsify the impure emulsified liquid, throwing its oil globules into larger globules of oil which rise leaving the water more or less clear and free from emulsion condition.

The period of time which the filter will successfully perform in this manner depends upon the allowable pressure-drop in a given installation.

In a certain sense this first filter is not really a filter in that it does not separate out, eradicate or remove the contaminating oil, since both the oil and the water pass through the precoat and the filter proper, although it is desirable to allow any of the oil which may rise to the top of the liquid before the latter passes through the filter-elements to do so and to permit its segregation from the main body of the liquid, and in this perception, the device is a filter.

Just how this de-emulsification is brought about is not known with certainty at the present time.

It may be that the extremely small spaces between the precoat particles and those in the filter-elements proper are so tenuous and slender and of appropriate length that the extremely-fine oil-particles are mechanically pressed together or consolidated or coalesced into relatively large droplets in size sufficient to rise to the surface of the liquid if permitted to do so or to be absorbed in a different type of filter.

On the other hand, there is a possibility that in passing through these minute openings of the precoat and filter, the physical dimension of the oil-droplet is approached by the sizes of the passages, and the paths that the particles of oil may pass through in the filter is very great in comparison with their own size, whereby the droplets of oil are forced together so that their repelling electrical charges are overcome and the droplets coagulate and in so doing the excess charges are taken up in the solution.

From this so-called filter, the de-emulsified liquid is fed to a second filter of similar precoated edge-filtration filter-packs and the oil is in such condition that very little of it passes through the filter almost all of it rising to the upper portion of the housing of such filter where provision is made to drain it off in its original form as a lubricant for use in an engine or turbine.

This secondary filter need not necessarily be precoated although it is preferable ordinarily to do so.

The filtrate water passing on from this second filter is relatively clean except for a possible slight discoloration on the top, similar to a scum, which is collected or absorbed by the material of the third filter through which the filtrate passes, such material desirably being of fabric, such as terry-cloth.

If the second filter were not precoated, the free oil at least in some degree would pass on to this third filter in considerably greater quantities which would reduce the usual life of the third filter without replacement of its filter-members.

This discoloration, if present, is oil which went through the second filter, but it is reduced to the extent that it is rarely in globular form, but instead is just a slight discoloration or a scum, visible on top of the water when a sample is taken, for example.

Precoating of the second filter while not absolutely essential has distinct advantages in that the cycle of operation may be continued from two to three times the normal cycle of operation for two reasons: First, the maximum allowable pressure-drop which is established by both filters and second, the life of the third terry-cloth filter which represents the final stage of the particular type of filter installation.

It has been discovered that the use of a suitable precoat of the type referred to on an edge-filtration filter of the character specified, such as one impregnated with a water-insoluble phenolic-resin, in the carrying out of the process or procedure referred to, that is the separation of oil from condensed steam, has outstanding advantages over anything heretofore attempted.

In the first place, in the edge-filtration type of filter mentioned, the structure affords a firm and rigid foundation or base for the precoat, whereas the filter-bed in the "bed-type" of filter is devoid of such essential properties in that it is made up of graded gravels or sand, the result being that the novel style of filter incorporating the present invention permits the use of a much thinner layer of precoat, say one-fourth or one-fifth, of that heretofore necessary, allowing the liquid to be forced through such thinner coating and filter at a much faster flow rate without causing disruption of the filter-bed.

This is another way of stating that the new precoated edge-filtration filter gives a substantially greater flow-rate than heretofore resulting in a more efficient action for the amount of precoat used, the proportion of surface area to the volume of the filter being enormously greater than in the bed-type of filter.

In the screen or cloth style of filter, the precoat is applied to the filter media by circulation of the precoat which eventually forms a coating or deposit thereon, but some of the precoat will go through the filter-media during such action by reason of the size of the holes in the media.

It is distinctly objectionable to employ this type of filter due to the fact that on ships where shocks may occur, channeling of the precoat, as well as of the filter, may occur, resulting in the precoat passing through the filter into the boiler causing disastrous results, that is to say the condensate goes on without being purified.

In the new style of filter, that is the precoated edge-filtration form, regardless of the shock, no change is made in the size of the precoat particles which will pass through the filter itself, due to which peculiar construction and the fineness of the edge-filtration over the other types of filters and also due to the ratio of the particles size of the precoat to the openings being less in the new type of filter and also, of course, by the more rigid construction over competitive filters.

In some cases it is advantageous to employ a so-called "tightening" agent with the precoat, such an agent or agents depositing a gelatinous film mixed with the precoat on the surface of the underlying precoat having the effect of filling up some of the interstices and providing a finer filter.

Because of the gelatinous nature of the material employed, if for any reason the pressure on the filter-packs should drop off, it would cause the precoat to remain adequately adhered to the pack rather than falling off and such tightening-agents have a third effect in that they render the precoat more readily removable by back blowing when required.

In employing such a tightening-agent, a layer of untreated precoat is first deposited on the pack, a mixture in the equivalent of 0.006 of a pound of ferrous-hydroxide or aluminum-hydroxide per pound of precoat used is made and then this mixture of tightened-precoat is applied over the surface of the already-applied untreated-precoat.

By reason of the novel precoated filter-pack construction employed, over a period of many hours of operation only a fraction of the amount of precoat is needed which would be required for other equipment; moreover, during the period of operation the new construction requires no mechanical equipment which must continually add precoat, and also, by virtue of the pack construction, prevention of the passage of any of the precoat-material to the boilers is reliably established.

Furthermore, the likelihood of cracking, which would allow channeling of the condensate is reduced to a minimum and should this occur the filter-pack continues to filter the condensate reducing it normally to a small percentage of the parts per million in the oily condensate, whereas a fracture in the bed of a filter having precoat only would normally allow the condensate in its original form to pass to the boilers.

To apply a new precoat to this type of edge-filter, the operation of the filter is discontinued, first allowing the water in the filter container to remain, and then applying dry steam at approximately 150 pounds pressure until the majority of the water in the container has been forced out of the top, and then the top outlet is closed and the bottom valve opened which pushes or discharges the precoat, the new precoat being applied thereafter.

Cleaning the novel filter-packs is not only a simple matter, but considerable objectionable features which are distasteful to operating personnel are eliminated; for example, by applying steam in reverse flow, the precoat material and other impurities are discharged without handling manually by workmen.

The employment of the current invention may be had by incorporating it in any one of a number of styles or forms of filters, but an appropriate type of multiple-filter in which it has been used with marked success will now be described, it being borne in mind that the details of such construction are the invention of another person.

In the drawings:

Figure 1 is a longitudinal, vertical, central section through the compound-filter;

Figure 2 is a top plan view of the filter;

Figure 3 is an elevation of the filter and associated parts on a smaller scale;

Figure 4 is a section on line 4—4 of Figure 1 on an enlarged scale illustrating the manner of anchoring or stabilizing the filter-elements; and Figure 5 is a longitudinal section on a larger scale of one of the edge-filtration filter-media.

A cylindrical metal-shell or casing 21 provides a filter-chamber 20 housing the initial or primary filter, characterized as a whole 22, and comprising a relatively-large number, in the present instance about 150, of round, elongated, hollow, edge-filtration filter-elements 23, 23, each composed of a series of registered layers of paper 24 in face-to-face contact with one another and held pressed together by an internal-spring 25 joined at its lower end to a metal or other terminal element 26 fitted with a long lengthwise-grooved rod 27 within the spring.

The topmost layer of paper or equivalent material is held pressed against the bottom face of a short metal-tube 28 occupying a corresponding-size hole through a downwardly-dished supporting-plate 29 to which the upper end of the tube is welded, a short rod 30 passing through the top, terminal eye of the spring, bearing on the upper end of the tube and holding the spring under suitable tension to apply the required upward compression of the main-body of the filter-element.

Plate 29 is dished or concaved downwardly as shown to provide or compensate for the rocking or pitching of the boat in which the compound-filter is mounted.

The paper of the filter is impregnated with a water-soluble phenolic-resin which by heat-polymerization has been rendered non-water-soluble, so that the thus-treated paper is stable and not detrimentally affected by any of the fluids, or their contaminants, with which it comes in contact, especially the water and the oil, it being understood, of course, that the filtered liquid passes inwardly through the shallow spaces between the paper-layers and then upwardly through the central passage occupied by the spring, being delivered through the metal-tube into the space 40 above plate 29.

The lower end of casing 21, by means of appropriate flanges, intervening gasket and bolts 19, is connected in liquid and pressure tight manner to the top open end of an inverted-conical metal-shell 31 having at its upper portion a lateral inlet-conduit 32 fitted with a downwardly-directed discharge-end 33 in register with the underlying apex of the cone 31, the latter at its lower part having a sidewise-directed drain 34.

Directly above casing 21 is a double-wall shell 41 enclosing chamber 40, such wall being composed of an outer-wall 42 and a smaller-diameter inner-wall 43 spaced inwardly away from such outer-wall, thereby providing between them an annular chamber or receptacle 44, flanges, gasket and bolts at 18 uniting together casing 21, plate or wall 29 and the double-shell 41 with annularly-spaced ports 45, 45 connecting the circular upper part of the filter-chamber 20 with the lower portion of the annular contaminant chamber 44.

Compartment 40 has a lateral admission-conduit 39, for a purpose hereinafter indicated, joined at the center of the chamber to an intermediate part of an upright conduit or pipe 46 the open top end of which is covered or hooded by a suitable downward deflector 48, the lower end of pipe 46 having a slide-valve 47 adapted to open and close connection of the lower part of chamber 40 with the interior of the pipe.

In shell or casing 41 is an inverted, sheet-metal cone 51, substantially like that characterized 31 previously referred to, the lower part of the interior of the cone 51 having a lateral, drain-pipe connection 52.

Above the inverted-cone shell 51 is a cylindrical, metal casing or shell 61, the lower end of which, and the top ends of shells 51 and 41 are fastened together in pressure and liquid tight manner by appropriate flanges, gaskets and bolts as shown at 60.

The top multi-apertured wall 62 of shell 61 is upwardly arched or dished, being substantially the opposite of that of plate 29, and it carries a large number, in the present case about 150, of depending, edge-filtration filter-packs 63 practically like those designated 23, except in some instances for one possible feature not yet referred to but which will be explained later.

The three walls 62, 61 and 51 define a second filter-chamber denoted as 64.

Spaced outwardly from wall 61 and concentric therewith is another round metal-wall 71 whose lower end has an annular horizontal plate 72 with an upstanding marginal flange 73, the former being welded at its inner edge to the plate 61 and the latter being welded to the outer surface of the lower portion of plate 71, another annular plate 74, spaced above plate 72, being welded at its inner and outer edges to elements 61 and 73, thus providing an annular chamber characterized 75.

The top of wall 71, by means of its outstanding flange 76 and an intermediate gasket, is fastened by bolts 77 to a round flat top plate 81 and welded to the latter is a dome-shaped metal-wall 91 equipped with a lifting-eye 92 and an external oil-outlet 93.

A short, centrally-located pipe 82 occupying registered openings in plates 62 and 81 and welded to both plates connects the upper portion of filter-chamber 64 with the oil-chamber 94 between the members 81 and 91.

In the annular compartment 100 between the concentric walls 61 and 71 are located a plurality of terry-cloth or comparable filters each characterized as a whole 101 and composed of a central, apertured metal-tube 102 closed at its top and surrounded by a number of layers of terry-cloth 103 through which the filtering action takes place.

The lower end of each such filter has a metal, centrally-apertured disc 104, the hole through which fits over an upstanding pipe 105 in communication with chamber 75, equipped with a delivery-conduit 113.

Above and in register with each oval-shaped terry-cloth filter 103, plate 81 has a correspondingly-shaped aperture or hand-hole 83 closed below by a cover-plate 84 hinged at 85 for horizontal swinging opening and closing movement, such closure normally being held securely closed by a yoke 86 and a cooperating bolt 87, by means of which structure any filter 103 can be readily lifted out and replaced by a washed one or a new one when required.

As illustrated in Figure 3, inlet-pipe 32 is connected through hand-operated valves 126 and 114 to a discharge-conduit 115 of a power-operated pump 116 having an admission-conduit 117 through which it receives the contaminated water, the pump feeding such water to be filtered under suitable pressure into chamber 20 of the primary-filter 22.

For the purpose of precoating the primary-filter or the secondary-filter, or both, the appliance may be supplied with a suitable tank or container 118 adapted to hold the pre-coat-material, the top of such tank being connected to pipe 115 by a pipe 119 equipped with a hand-valve 121, and the bottom of the tank is joined to pipe 32 by a pipe 122 fitted with another valve 123.

In addition, pipe 32 is connected to pipe 39 by a connection 124 having a control-valve 125, pipe 32 having a valve 126 in the relation shown.

Drain 34 is connected to a discharge-pipe 126 through a normally-closed hand-operated valve 127 and in similar manner the drain 52 of the second chamber is joined to the same discharge-pipe 127 by a pipe 128 supplied with a conventional valve 129 ordinarily closed.

The upper portion of chamber 40 has one or more oil-delivery pipes 111 connected through a pressure-regulator 131 with a main oil-discharge pipe 132, one such pipe 111 being shown in Figure 1 and another presented in Figure 3; the upper part of the annular oil-chamber 44 by means of one or more pipes 110 being joined through a pressure-regulator 133 to the same pipe 132; the top part of chamber 100 being similarly connected to the same main-discharge-pipe by one or more pressure-regulator equipped pipes 134; the top oil-dome or chamber 94 in comparable manner being connected by pipe 135 to the same pipe 32 through a pressure-regulator.

To stabilize the numerous filter-elements of the primary and secondary filters, the depending cylindrical lug 136 of each end-closure member 26 is supplied with two non-intersecting apertures 137 and 138 (Figure 5) therethrough at a right-angle to one another and through these stabilizing-wires extend so as to tie the several filter-packs together, for instance, if the packs are arranged in more or less radial rows, corresponding wires 139 may be used for one set of holes and circular wires 141 for the other apertures, but any appropriate arrangement may be employed to accomplish the desired purposes.

Assuming that the surface of each of the filter-packs 23 of the primary-filter and 63 of the secondary-filter has been coated with a suitable tightened precoat or filter-aid as hereinbefore referred to, and that the drains 34 and 52 are closed by their valves 127 and 129, the water containing the contaminating oil in emulsified form is pumped under pressure into the cone 31 and filter-chamber 20 (with valves 114 and 126 open and valves 121, 123 and 125 closed), inwardly through the large number of filter-media 23, 23, and upwardly into chamber 40, such liquid, originally in the form of an emulsion, in passing through the precoats and filters having its oil-globules enlarged sufficiently to de-emulsify the liquid wholly or in substantial measure.

The oil, if any, which rises to the top of the liquid in the filter-chamber 20 outside of the filter-packs flows upwardly through the apertures or ports 45, 45 into the circular chamber 44 leaving the upper part of the latter through the one or more discharge-pipes 110 into the delivery-pipe 132, the proper pressure being maintained in the system by the pressure-regulator 133.

In this relation, plate 29 is dished, as shown, so that, regardless of any tipping or inclination of the boat in any direction, the oil finds easy flow to the then highest point of the chamber at which some of the ports 45 are in direct communication for ready upward flow of the oil.

The de-emulsified, separated oil in the water in chamber 40 naturally rises to the top of the liquid in such compartment and it is automatically delivered from the filter through the one or more discharge-pipes 111 communicating with the top portion of such chamber.

Both passages 39 and 52 being closed, the liquid in the lower portion of chamber 40 is forced up conduit 46 by the pump, maintaining valve 47 open, into chamber 64.

Any remaining oil in the water in filter-chamber 64 automatically rises to the top thereof and flows through the central connection 82 into compartment 94 from which it is delivered through the vent 93 and the discharge-pipe 135, the plate 62 being domed upwardly to facilitate the flow of oil to such central point regardless of any tilt of the vessel.

The water passes through the edge-filtration filter-packs 63 in such space 64 and through the apertures of plate 62 into the annular compartment 100, through the cloth-filters 103 which absorb the remaining oil, if any is present, and the purified water is discharged through the outlet connection 113.

Any oil present on the surface of the liquid in chamber 100 is discharged through the connection 134, all as will be readily understood.

Thus, there are several points of oil exits from the filter into a discharge-pipe common to all of them, and this function is performed with maintenance of proper pressure in the filter by reason of the automatic action of the several pressure-regulators, although, in some cases, a single such regulator might be feasible.

The sleeves or tubes 28 forming the top portions of the numerous filter-elements of both the primary and secondary filters perform the double function of efficiently and effectively supporting the filter-packs and of positioning the filter-packs sufficiently below their common apertured supporting-plate that the oil in the upper portion of the chamber is desirably out of contact with the operative portions of the filter-elements.

Thus it will be readily understood that the original contaminated liquid in emulsified form is de-emulsified thus separating it into its constituents of different specific-gravities which property is utilized to effect their ultimate complete segregation, the oil, in this instance, being the polluting agent which is removed from the filtrate.

Those acquainted with this art will readily understand that this invention is not necessarily limited and restricted to the precise details illustrated and described and that various modifications may be resorted to without departure from the heart and essence of the invention and without the loss or sacrifice of any of its material benefits and advantages, for example, one of the edge-filtration filters may be omitted, this, of course, putting a greater portion of the work on the terry-cloth filters.

I claim:

1. In a multiple-filter having a plurality of filters connected together in series operative relation, means to admit into the first filter of the series an emulsified liquid incorporating a liquid of lesser specific-gravity than the remainder of the liquid, and means to discharge the filtrate from the final filter of the series, the novel combination of improvements being (a) that each of the first and second filters of the series has a plurality of rigid edge-filtration filter-elements in parallel operative relation and each constituting the support for, and having its surface coated with, a granular-agent the particles of which are of a size to preclude their passage through the shallow filtering spaces of the filter-element, (b) that the interstices of said coated filter-elements of the first filter through which the emulsified liquid flows are of such size as to deemulsify such liquid in major degree by enlargement of the globules of the lesser specific-gravity liquid thereof thereby permitting such lesser specific-gravity liquid to rise to the top of the liquid in advance of the filter-elements of the second filter, (c) that the passages through the coated filter-elements of the second filter are of such size as to preclude such larger globules from passing therethrough, (d) means to remove from the multiple-filter such floating liquid excluded by said second-filter filter-elements, and (e) that the third filter of the series comprises a plurality of absorption-filters in parallel operative relation which absorb any remnant of the lighter specific-gravity liquid which may reach them while permitting the liquid of greater specific gravity to flow therethrough.

2. The novel combination of improvements in a multiple-filter as set forth in claim 1, in which each absorption-filter of said third filter comprises a plurality of layers of terry-cloth in multiple thickness relation.

3. The novel combination of improvements in a multiple-filter as set forth in claim 1, including in such combination the additional improvement that the outer portions only of the thickness of the coatings of the first-filter filter-elements incorporate a tightening-agent.

4. The novel combination of improvements in a multiple-filter as set forth in claim 1, in which each edge-filtration filter-element of the first and second filters is composed of a hollow body of registered layers of uneven-surface paper impregnated with a water-insoluble polymerized water-soluble resin.

5. In a duplex-filter having a pair of filters connected together in series operative relation, means to admit into the first filter of the series an emulsified liquid incorporating a liquid of lesser specific-gravity than that of the remainder of the liquid, and means to discharge the filtrate from the second filter, the novel combination of improvements being (a) that said first filter comprises a plurality of rigid edge-filtration filter-elements in parallel operative relation and each constituting the support for, and having its surface coated with, a granular-agent the shallow filtering-spaces of the filter-elements being of such size as to preclude the passage of particles of the granular-agent therethrough, the interstices of said coated filter-elements through which the emulsified liquid flows deemulsifying such liquid in major degree by enlargement of the globules of the liquid of lesser specific-gravity thereof and permitting such modified lighter liquid to rise to the top of the liquid in advance of said second-filter filter-elements, (b) means to remove such floating liquid from the duplex-filter in advance of the second filter, and (c) that the second filter of the series comprises a plurality of absorption-filters in parallel operative relation absorbing such of said lighter specific-gravity liquid that comes into contact with them while the liquid of greater specific gravity passes through them.

6. The novel combination of improvements in a filter as set forth in claim 5, in which each of the absorption-filters of said second filter comprises a plurality of layers of terry-cloth in multiple thickness relation.

7. The novel combination of improvements in a filter as set forth in claim 5, in which each edge-filtration filter-element of the first filter is composed of a hollow body of registered layers of uneven-surface paper impregnated with a water-insoluble polymerized water-soluble resin.

WALTER S. VANCE.

REFERENCES CITED

The following references are of record in the file of this patent:

UNITED STATES PATENTS

| Number | Name | Date |
|---|---|---|
| 556,593 | Turner | Mar. 17, 1896 |
| 630,363 | Krause | Aug. 8, 1899 |
| 760,364 | Woolworth | May 17, 1904 |
| 802,714 | Smith | Oct. 24, 1905 |
| 821,937 | Greatsinger | May 29, 1906 |
| 1,049,547 | Strauss et al. | Jan. 7, 1913 |
| 1,179,157 | Braun | Apr. 11, 1916 |
| 1,198,039 | Krause | Sept. 12, 1916 |
| 1,242,784 | Dyer et al. | Oct. 9, 1917 |
| 1,257,384 | Packer | Feb. 26, 1918 |
| 1,304,124 | Trumble | May 20, 1919 |
| 1,455,136 | Gentzel | May 15, 1923 |
| 1,530,087 | MacArthur | Mar. 17, 1925 |
| 1,547,712 | Zoul | July 28, 1925 |
| 1,663,322 | Tekavec | Mar. 20, 1928 |
| 1,734,197 | Blumenberg | Nov. 5, 1929 |
| 1,744,510 | Hele-Shaw et al. | Jan. 21, 1930 |
| 1,747,175 | Mahler | Feb. 18, 1930 |

(Other references on following page)

UNITED STATES PATENTS

| Number | Name | Date |
|---|---|---|
| 1,754,068 | Travers | Apr. 8, 1930 |
| 1,757,554 | Auberschek | May 6, 1930 |
| 1,771,928 | Jung | July 29, 1930 |
| 1,777,546 | Blumenberg | Oct. 7, 1930 |
| 1,778,596 | Heibig | Oct. 19, 1930 |
| 1,873,597 | Jones | Aug. 23, 1932 |
| 1,972,454 | Manley et al. | Sept. 4, 1934 |
| 1,992,101 | Stuart | Feb. 29, 1935 |
| 2,041,763 | Heckman | May 26, 1936 |
| 2,079,475 | Williams et al. | May 4, 1937 |
| 2,082,847 | Petty | June 8, 1937 |
| 2,218,226 | Williams | Oct. 15, 1940 |
| 2,305,657 | Aehrelt | Dec. 22, 1942 |
| 2,347,927 | Paterson et al. | May 2, 1944 |
| 2,363,188 | McDorman | Nov. 21, 1944 |
| 2,367,873 | Kasten | Jan. 23, 1945 |

FOREIGN PATENTS

| Number | Country | Date |
|---|---|---|
| 544,664 | Germany | Feb. 24, 1932 |

OTHER REFERENCES

"The Separation of Emulsions by Filtration and Ultra-Filtration," Hatscher, published in "Zeitschrift für Chemie & Industrie der Kollide," vol. VI, No. 51, Apr. 1940, 252–324.